United States Patent
Pindzola

(10) Patent No.: US 11,296,646 B2
(45) Date of Patent: Apr. 5, 2022

(54) ALIGNMENT DEVICE

(71) Applicant: Andrew Pindzola, Prescott, AZ (US)

(72) Inventor: Andrew Pindzola, Prescott, AZ (US)

(\*) Notice: Subject to any disclaimer, the term of this patent is extended or adjusted under 35 U.S.C. 154(b) by 0 days.

(21) Appl. No.: 17/465,452

(22) Filed: Sep. 2, 2021

(65) Prior Publication Data

US 2022/0069763 A1 Mar. 3, 2022

Related U.S. Application Data

(60) Provisional application No. 63/073,887, filed on Sep. 2, 2020.

(51) Int. Cl.
| | |
|---|---|
| *H02S 20/23* | (2014.01) |
| *H02S 30/10* | (2014.01) |
| *H02S 20/24* | (2014.01) |
| *F24S 25/63* | (2018.01) |
| *F24S 25/61* | (2018.01) |
| *H02S 20/30* | (2014.01) |
| *F24S 30/00* | (2018.01) |

(52) U.S. Cl.
CPC .............. *H02S 20/23* (2014.12); *F24S 25/61* (2018.05); *F24S 25/63* (2018.05); *F24S 30/00* (2018.05); *H02S 20/24* (2014.12); *H02S 20/30* (2014.12); *H02S 30/10* (2014.12); *F24S 2030/14* (2018.05); *Y02B 10/10* (2013.01)

(58) Field of Classification Search
CPC .. F24S 25/61; F24S 25/63; F24S 30/00; F24S 2025/014; F24S 2030/14; H02S 20/23; H02S 20/24; H02S 20/30; H02S 30/10; Y02B 10/10

See application file for complete search history.

(56) References Cited

U.S. PATENT DOCUMENTS

| | | |
|---|---|---|
| 5,584,458 A | 12/1996 | Rando |
| 6,606,798 B2 | 8/2003 | El-Katcha et al. |
| 7,184,239 B2 | 2/2007 | Starr et al. |
| 7,310,886 B2 | 12/2007 | Bascom et al. |
| 9,074,797 B2 | 7/2015 | Miller et al. |
| 9,441,967 B2 | 9/2016 | Ranieri et al. |

OTHER PUBLICATIONS

"Daylight Laser for Rail Leveling?", SolarPanelTalk.com. https://www.solarpaneltalk.com/forum/solar-panels-for-home/solar-panel-system-equipment/19181-daylight-laser-for-rail-leveling [Date accessed: Jun. 16, 2020].

*Primary Examiner* — Jessie T Fonseca
(74) *Attorney, Agent, or Firm* — Houda El-Jarrah; Bold IP, PLLC

(57) ABSTRACT

One or more embodiments of a system including a laser emitting device and a target is disclosed. The laser emitting device includes a connector configured to connect to a device having a flat top extending in a first plane and a flat side extending in a second plane, and a laser emitter connected to the connector such that when the connector is connected to the device, the laser emitter is configured to emit a laser in a first direction parallel to the first plane and the second plane. The target includes a body, a tray including at least one slit in a front side of the tray configured to allow passage of the laser into the tray, a neck connecting the body to the tray, and legs connected to the body and configured to support the body, neck, and tray.

5 Claims, 5 Drawing Sheets

ALIGNMENT DEVICE

CROSS REFERENCE TO RELATED APPLICATIONS

This application claims priority to Provisional Application No. 63/073,887, which was filed Sep. 2, 2020, which is incorporated in its entirety.

FIELD OF THE DISCLOSURE

The present invention relates to devices for aligning solar panels and other objects on the roof of a house or other building.

BACKGROUND

Rooftop solar panels are an efficient and environmentally friendly way of utilizing rooftop space to generate electricity. It is functionally and aesthetically important for solar panels to be properly aligned.

Solar panels are generally mounted on rails or other raised mounts so the solar panels can be secured properly and conveniently serviced. The elevated nature of the mounting combined with the slope of the roof make it difficult for a technician to use conventional methods to level the solar panel. Furthermore, even if the solar panel is level relative to gravity, it may not appear to an observer that the solar panel is level because the roof may not be completely level or roof elements such as rows of shingles or roof edges may not be completely level. Because of these factors, existing methods for leveling solar panels are inconsistent, ineffective, or prohibitively expensive in terms of resources or time.

SUMMARY

One or more embodiments are provided below for a system or device for aligning a solar panel or other device on the roof of a house or other building and a method for aligning the solar panel or other device. The system may include a laser emitting device and a target. The laser emitting device may include a connector configured to connect to a device having a flat top extending in a first plane and a flat side extending in a second plane and a laser emitter connected to the connector such that when the connector is connected to the device, the laser emitter is configured to emit a laser in a first direction parallel to the first plane and the second plane. The target may include a body, a tray including at least one slit in a front side of the tray configured to allow passage of the laser into the tray, a neck connecting the body to the tray, and legs connected to the body and configured to support the body, neck, and tray.

The system may provide significant advantages over the devices known in the art. Because roof mounted solar panels are mounted on a roof that may not be level, devices such as levels which determine the alignment of the solar panel with the gravitational direction may not be able to align the solar panel with the roof. Furthermore, roof shingles are often laid out in rows which may or may not be completely level. If the solar panel is aligned with the gravitational force or even with the roof, it may look like it is out of alignment if the roof shingles do not align with the direction of the solar panel. The system and device described herein may be used to align the solar panel with roof elements such as a roof edge or rows of roof shingles so that the solar panel is in alignment with the roof or roof elements. The front face of a target may be set perpendicular to the roof element and a laser from the laser emitting device may pass to the target so that an alignment can be determined. Thus, the system may be advantageously used to determine an alignment of a solar panel to a roof element.

Other advantageous features as well as other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
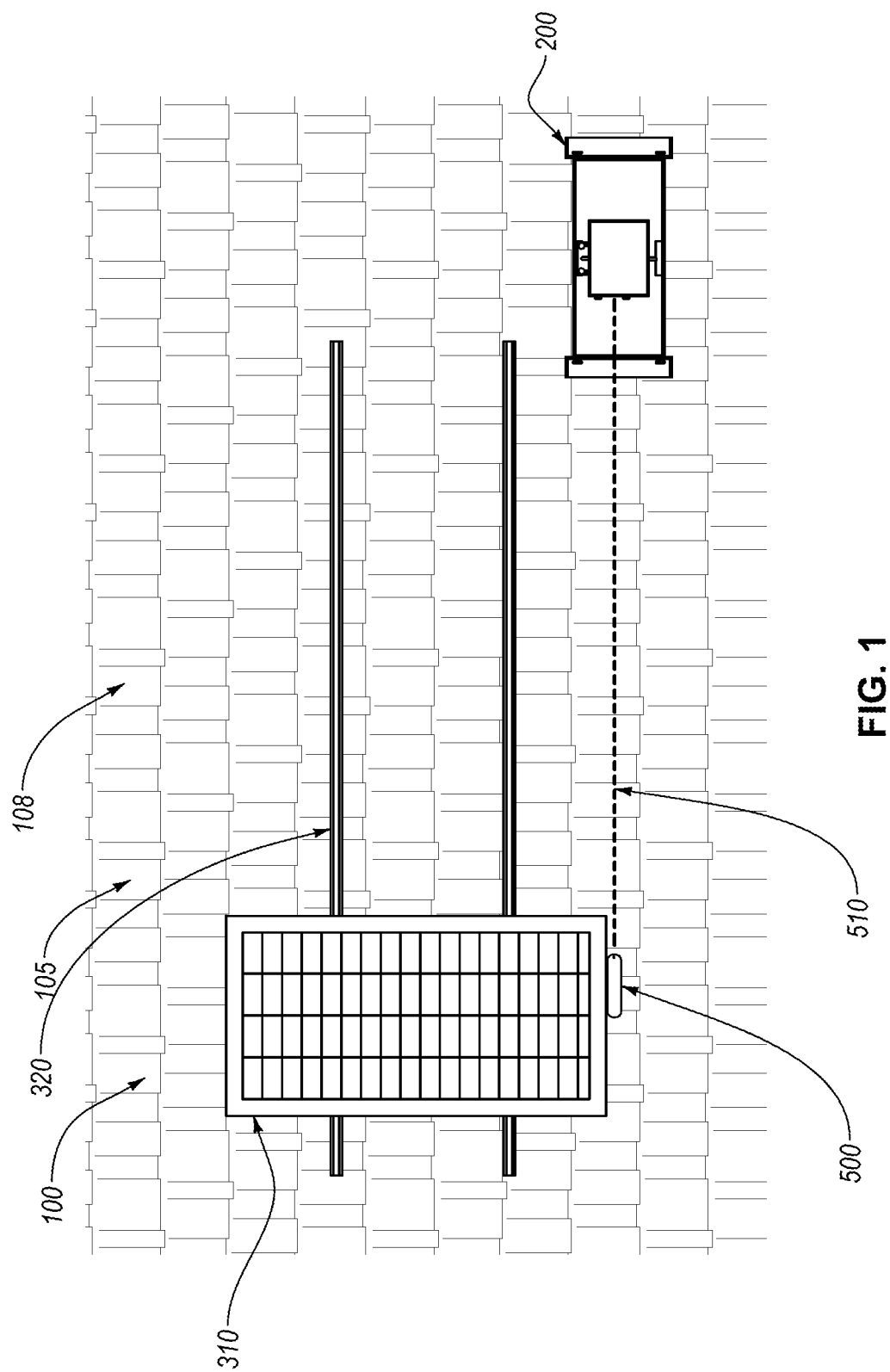
FIG. 1 shows an example top view of a rooftop where a solar panel is being aligned.

In the Summary above and in this Detailed Description, the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, and steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "coupled to" as used herein may mean a direct or indirect connection via one or more components.

Referring now to the drawings and the following written description of the present invention, it will be readily understood by those persons skilled in the art that the present invention is susceptible to broad utility and application. Many embodiments and adaptations of the present invention other than those herein described, as well as many variations, modifications, and equivalent arrangements will be apparent from or reasonably suggested by the present invention and the detailed description thereof, without departing from the substance or scope of the present invention. This disclosure is only illustrative and exemplary of the present invention and is made merely for purposes of providing a full and enabling disclosure of the invention.

FIG. 1 shows an example top view of a rooftop 100 where a solar panel 310 is being aligned. The rooftop 100 may include roof 105 with shingles 108, the solar panel 310, rails 320, laser device 500 emitting laser 510, and target 200. The solar panel 310 may be secured to the rails 320 which are secured to the roof 105. The solar panels 310 may be secured to the rails 320 by screws, bolts, or the like connected to the bottom side of the solar panel 310. The rails 320 may similarly be secured to the roof 105 by bolts, screws, or the like. The shingles 108 may be arranged in horizontal rows which are parallel to a side of the roof 105.

The solar panel 310 when secured to the rails 320 may be about 4-12 inches above the roof 105. The solar panels 310 are secured to the rails 320 above the roof 105 so the solar panels 310 are secured properly and so the solar panels 310 are able to be conveniently serviced.

The laser device 500 may be secured to a side of the solar panel 310. The target 200 may be located on the roof 105 and aligned such that the laser 510 passes through a slit (discussed further below) in the target 200 if the solar panel 310 is aligned. Even if the rails 320 are perfectly aligned the solar panels 310 mounted on the rails 320 may not be perfectly aligned. Generally, the rails 320 are more easily aligned relative to the rows of shingles 105 because the rails 320 are mounted directly on the rows of shingles 108. For example, each side of a rail may be mounted through shingles 108 in a row of shingles 108. The height of the solar panel 310 above the shingles 105 makes it much more difficult to perfectly align the solar panel 310 with a row of shingles 105. In many circumstances, several solar panels 310 will be mounted side by side in a row to a pair of rails 320 where a small misalignment of the first solar panel 310 can lead to an obvious misalignment of the row of solar panels 310 mounted side by side.

The rails 320 may be stainless steel, aluminum, plastic, carbon fiber, or another durable material suitable for securing a solar panel 310 and being exposed to the elements (sun, rain, snow, etc.). The solar panel 310 may be a rectangular commercially available solar panel or other similar product. As will be discussed in greater detail below, the laser device 500 may be secured to the solar panel 310 by a clamp, magnet, adhesive, or other securing mechanism. The laser device 500 may be secured such that the laser 510 is transmitted parallel to a side of the solar panel 310 (for example, the lower side, from the perspective of FIG. 1, of the solar panel 310) and parallel to the plane of the roof 105. The solar panel 310 may be aligned relative to a side (or edge) of the roof 105 or to the rows of shingles 108.

Figure 2A:
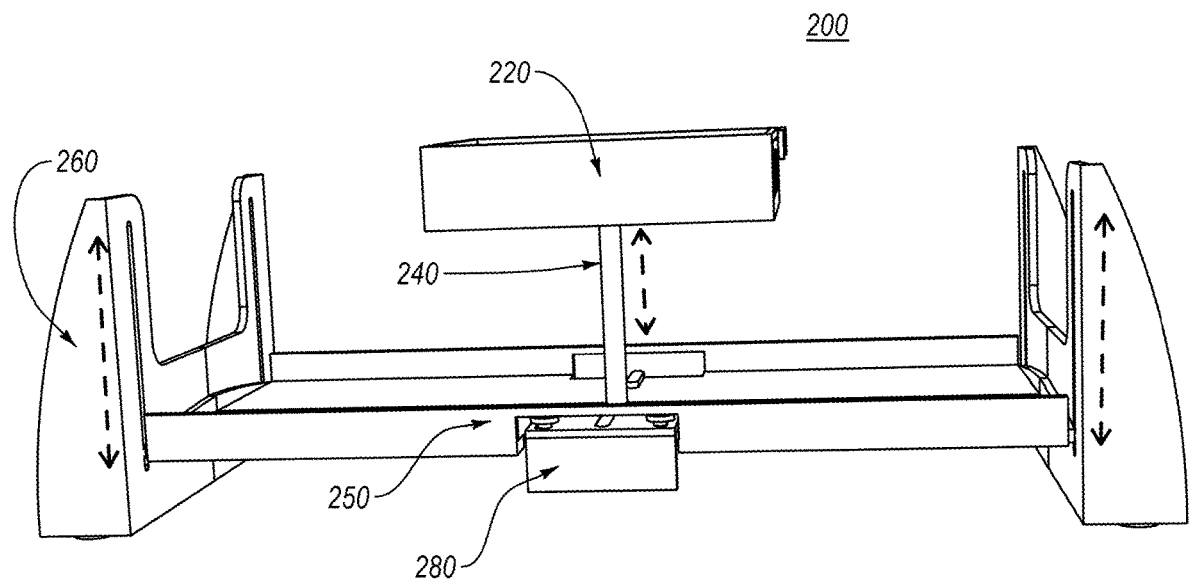
FIG. 2A shows an example side view of a target.

FIG. 2A shows an example side view of a target 200. For example, FIG. 2A may be a view of the lower side of target 200 in FIG. 1. The target 200 may be an example of the target 200 of FIG. 1. The target 200 may include a tray 220, a neck 240, a body 250, and legs 260. The height of the tray 220 may be adjusted by adjusting the neck 240 and or the height of the legs 260. The tray 220, neck 240, body 250, and legs 260 may be made of metal, plastic, or other durable materials. The legs 260 may include feet made of rubber or other similar high friction materials to give the target 200 sufficient friction to stay in place when placed on a slanted roof of up to about 45 degrees. The tray 220 may have a bottom and also include four sides that extend upwards. The top of the tray 220 may be open to allow for easy viewing of an interior of the tray 220. The tray 220 may be made of a material and have a color that allows for a red or a green laser point to be viewed on a surface of the tray in daylight. The tray 220 may have a rectangular prism shape with an open top. The feet of the legs 260 of the target 200 may be aligned with the tray 220 and may be used to align the tray 220 with roof elements.

The target 200 may also include an alignment device 280. The alignment device 280 may include a sheet of plastic, metal, or other stiff material that may have one end inserted into a slot of the body 250 and a second end that extends downward and is flat and perpendicular to the front side of the tray 220 when inserted into the slot in the body 250. The alignment device 280 may be able to move in and out of the slot in the body 250 such that the distance of the second end of the alignment device from the body 250 is variable. Thus, the alignment device 280 may be used to align with an element of the roof 105 that is not directly adjacent to the body 250 of the target 200. In this way the target 200 may be aligned with a row of shingles 108 or an edge of the roof 105. Restated, using the alignment device 280, the front side of the target 200 may be aligned perpendicular to a roof element that is parallel to the alignment device 280 extending from the slot in the body 250. The body 250 may include slots on each side, including a first side and a second side opposite the first side. When the alignment device 280 is inserted into the slot in the first side or the second side of the body 250, the second end of the alignment device 280 may be perpendicular to the front side of the tray 220. Slots may also be included in a third side and a fourth side of the body. When the alignment device 280 is inserted into the slot in the third side or the fourth side of the body 250, the second end of the alignment device 280 may be parallel to the front side of the tray 220. Accordingly, the alignment device 280 may also be used to align the front side of the tray 220 parallel to a roof element. Alternatively, the legs 260 may be used to align the front side of the tray 220 parallel to a roof element.

Figure 2B:
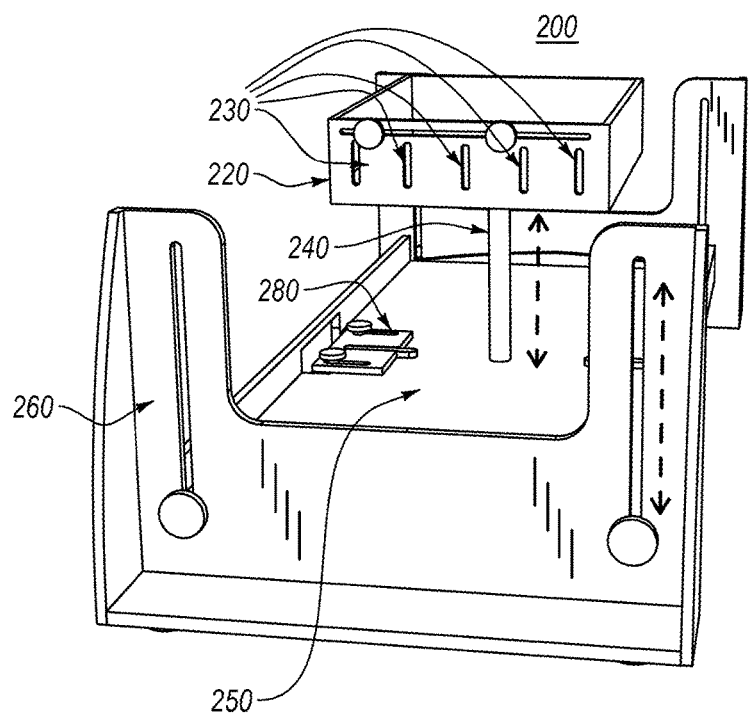
FIG. 2B shows an example front view of a target.

FIG. 2B shows an example front view of the target 200. For example, FIG. 2B may be a view of the left side of target 200 in FIG. 1. The tray 220 may include slits 230 on a side of the tray 220 facing the laser device 500 when aligning the solar panel 310. The slits may be about 2-3 inches high and about ½ inch wide with a gap of about 1 inch between the slits 230. The tray 220 may include many slits 230, for example 3, or in other examples 7 or more. The height of the slits allows for some error in the height of the tray 220 without additional adjustments being needed. The error in height may be caused by one or more of the roof 105, shingles 108, rails 320, and solar panel 310 not having completely flat top surfaces, such that the laser device 500 does not emit a laser 510 that is perfectly parallel to the top surface of the roof 105. The plurality of slits allows for the target 200 to be placed with only a general idea of where the perfectly aligned laser should point. Accordingly, the target 200 can be used to align the solar panel 310 without having to determine an exact location for the target 200. This allows for fewer steps when aligning the solar panel 310 than using a flat target without slits because a flat target cannot determine the angle of the laser and so must be precisely measured to determine the correct location where a laser for a perfectly aligned solar panel 310 will land on a two-dimensional plane.

The tray 220 may be able to move in a direction parallel to the plane of the side of the tray with the slits 230 such that if the laser contacts the tray 220 between two slits 230, the tray may be adjusted so the laser passes through one of the slits 230.

Figure 2C:
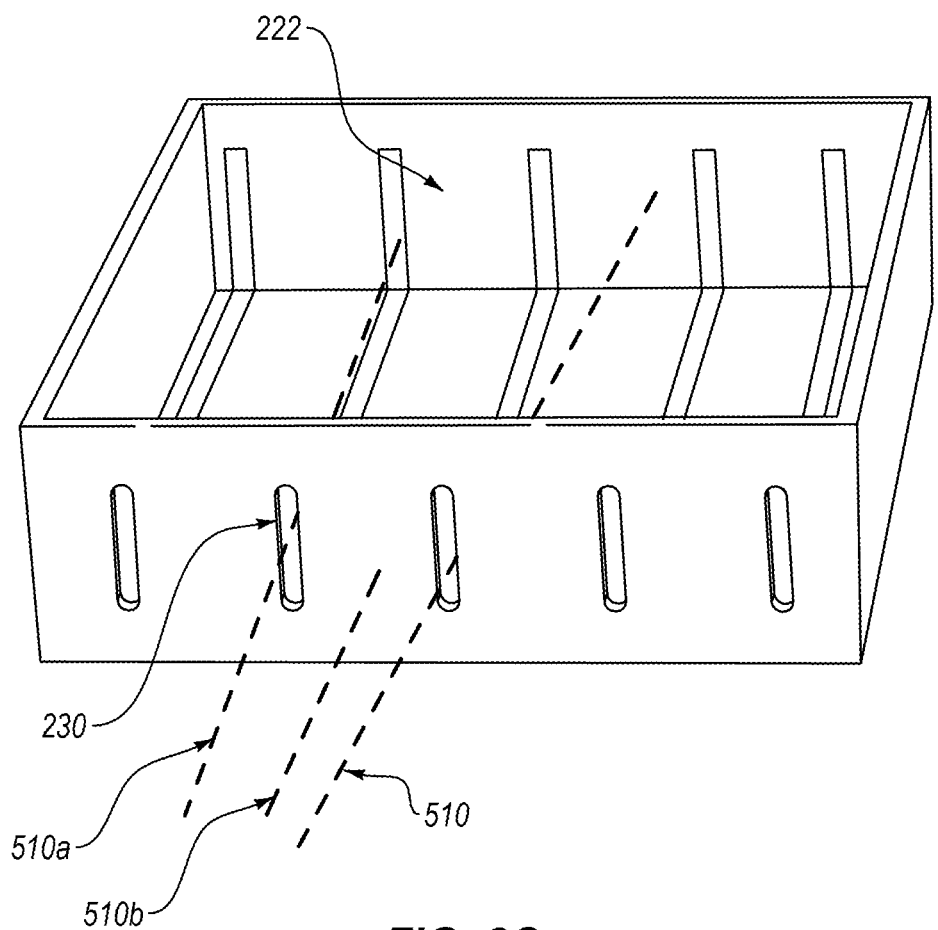
FIG. 2C shows an example top perspective view of the tray.

FIG. 2C shows an example top perspective view of the tray 220. The tray 220 may have dimensions of about 12-18 inches by 12-18 inches by about 3-6 inches. An interior side of the tray 220 may include alignment indicators 222 to mark where the laser 510 will contact the tray if the solar panel 310 is aligned and laser 510 pointed through the slit 230. The alignment indicators 222 may be aligned with the slits 230, for example, if the slit is 4 inches from the right side of the tray 220 the alignment indicator may also be 4 inches from the right side of the tray on an interior back of the tray and along the bottom of the tray 220 (from the perspective of FIG. 2C). The alignment indicators 222 may be a marking for a location for alignment or other indictors. Thus, using alignment indictors the angle of the first laser 510A and second laser 510B may be used to determine whether the solar panel 310 is correctly aligned. For example, laser 510A may pass through the slit and contact the corresponding marking in the tray for the slit to indicate that the solar panel 310 is aligned. As a second example, a laser 510B may contact the front side of the tray 230 and not pass through a slit, which does not provide enough information to determine the alignment of the solar panel 310. The target 310 (or tray 220) may be adjusted sideways (perpendicular to the front side of the tray 220) to allow the laser 510B to pass through a slit so the alignment can be determined. The distance the alignment device 280 is extended from the body may be adjusted to ensure alignment with the roof element when the target 200 is moved. As a third example, laser 510C may pass through a different slit and not contact the corresponding alignment indicator 222 indicating that the solar panel 310 is not aligned.

Figure 3A:
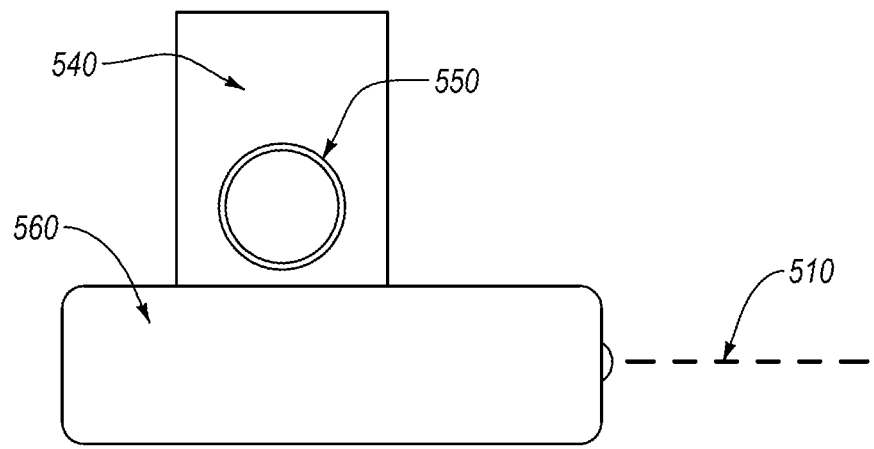
FIG. 3A shows an example top view of a laser device.

FIG. 3A shows an example top view of a laser device 500. The laser device 500 may include a laser emitter 560 which emits laser 510, a horizontal securing device 540, and optionally a screw 550. The laser emitter 560 may be a commercially available laser pointer that emits a laser 510 of red or green light. Horizontal securing device 540 may be plastic or metal or a similar material and secure the laser device 500 to a top surface of a solar panel 310 such that the laser 510 is emitted parallel to a plane of the top surface of the solar panel 310. The screw 550, when included, may be used to clamp the horizontal securing device 540 to the solar panel 310.

Figure 3B:
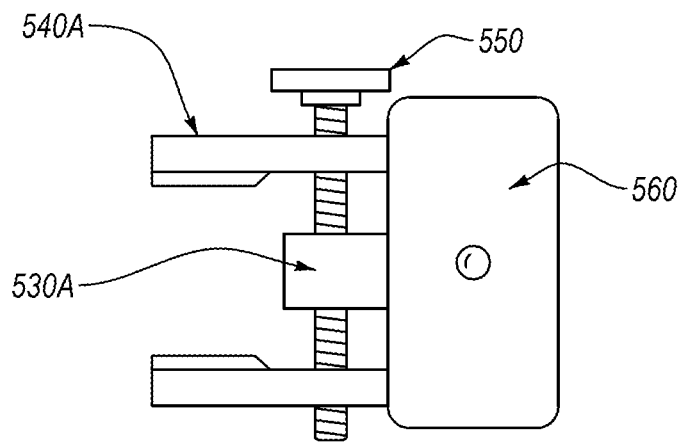
FIG. 3B shows an example side view of a first laser device.

FIG. 3B shows an example side view of a first laser device 500A. The first laser device 500A may be an example of the laser device 500 of FIG. 3A. The first laser device 500A may include the laser emitter 560, the screw 550, a first horizontal securing device 540A, and a first vertical securing device 530A. The first horizontal securing device 540A may be an example of the horizontal securing device 540 of FIG. 3A.

The first horizontal securing device 540A may include two clamping surfaces that are secured to the solar panel 310 using the screw 550. The first vertical securing device 530A may incase the screw 550 and provide a flat surface that, when pressed against a side of the solar panel 310, aligns the laser emitter 560 such that the laser 510 is emitted parallel to the plane of the side of the solar panel 310.

Figure 3C:
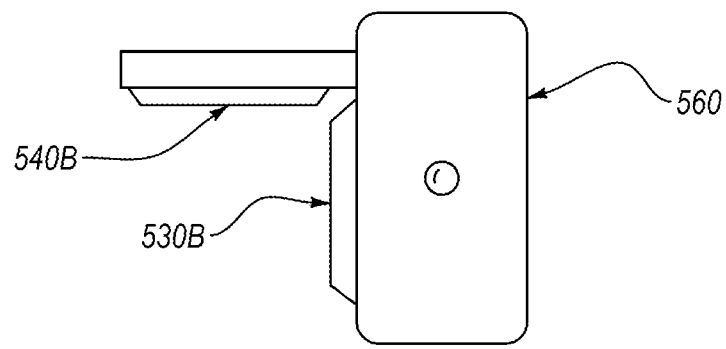
FIG. 3C shows an example side view of a second laser device.

FIG. 3C shows an example side view of a second laser device 500B. The second laser device 500B may be an example of the laser device 500 of FIG. 3A. The second laser device 500B may include the laser emitter 560, a second horizontal securing device 540B, and a second vertical securing device 530B. The second horizontal securing device 540B may be an example of the horizontal securing device 540 of FIG. 3A.

The second horizontal securing device 540B may include a single flat horizontal protrusion that when pressed against a top surface of the solar panel 310 causes the second laser device 500B to emit the laser 510 parallel to the plane of the top surface of the solar panel 310. The second vertical securing device 560B may provide a flat surface that when pressed against a side of the solar panel 310 aligns the laser emitter 560 such that the laser 510 is emitted parallel to the plane of the side of the solar panel 310. At least one of the second horizontal securing device 540B and the second vertical securing device 560B may be or may include a magnet to secure the laser device 500B to the solar panel 310. For example, the second vertical securing device 530B may be a bar magnet.

Figure 4:
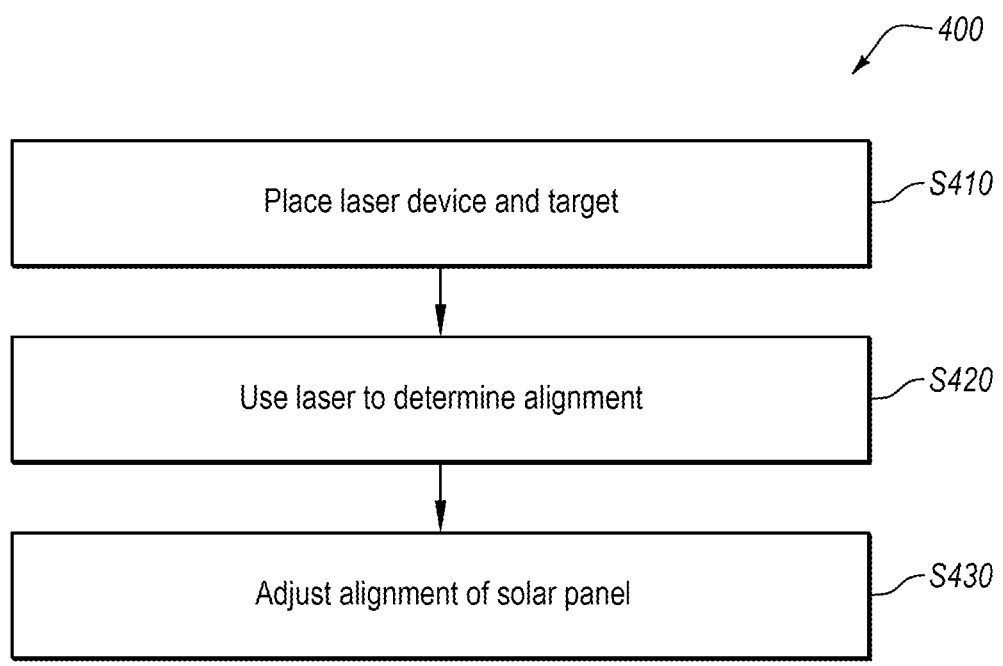
FIG. 4 Shows an example flowchart for a method of aligning a solar panel.

FIG. 4 Shows an example flowchart 400 for a method of aligning a solar panel 310. At S410, the laser device 500 and target 200 may be placed. The laser device 500 may be secured to a side of the solar panel 310 such that the laser 510 emitted from the laser is emitted parallel to the plane of the top surface of the solar panel 310 and the plane of the side surface of the solar panel 310.

The target 200 may be placed such that the side of the tray 220 with the slits 230 is perpendicular to a feature of the roof 105, such as a row of shingles 108 or an edge of the roof 105. The target 200 may be aligned using the alignment device 280. For example, the alignment device 280 may be placed with the bottom edge aligned with an edge of the roof 105 or row of shingles 108 such that the side of the tray 220 with the slits 230 is perpendicular to the edge of the roof 105 or row of shingles 108. As another example, the target 200 may be aligned using the legs 260. The bottom of the legs 260 may be aligned with an edge of the roof 105 or row of shingles 108 such that the side of the tray 220 with the slits 230 is perpendicular to the edge of the roof 105 or row of shingles 108.

The distance of the target 200 from the laser device 500 may be about 10-50 feet. A user placing the target 200 on the roof may estimate the location where a laser 510 will land when the solar panel 310 is perfectly aligned and place the target 200 such that the slits 230 are at that location. If the user's estimate is sufficiently close (within about a 4-inch window when 3 slits are included in the tray and within about a 12-inch window when 7 slits are included in the tray) to the actual location for the laser 510 to land when the solar panel 310 is perfectly aligned, then the solar panel 310 may be aligned without repositioning the target 200. The user may do his or her best to align the solar panel 310 with the roof 105 without measuring, cause the laser device 500 to emit the laser 510, and then place the target 200 so that the laser 510 passes through one of the slits 230. The height of the tray 220 may be adjusted such that the laser 510 contacts a portion of the tray 220.

At S420, the user may use the laser 510 to determine if the solar panel 310 is aligned. This may include initiating the laser 510 if it has not already been initiated. If the laser 510 passes through a slit 230 and contacts a corresponding second label 222 (such as the example laser 510A of FIG. 2C), the solar panel 310 is aligned. If the laser 510 passes through a slit but does not contact a corresponding label 222 (such as the example laser 510C of FIG. 2C), then the solar panel 310 is not aligned. If the laser 510 does not pass through a slit 230, the user may determine that the target 200 needs to be adjusted. For example, if the laser contacts the tray 220 between two slits 230 (as in laser 510B of FIG. 2C), the tray 220 may be moved relative to the rest of the target 200 so that the laser 510 passes through one of the slits 230. If the laser 510 contacts the tray 220 outside of the area with slits 230 or does not contact the tray 220, then the target 200 may be adjusted until the laser 510 passes through one of the slits 230 and the alignment of the solar panel 310 can be determined. Once the laser 510 is passing through one of the slits 230, the user may determine if the solar panel 310 is aligned with the roof element (such as an edge of the roof 105, or row of shingles 108). The solar panel 310 is determined to be misaligned if the laser 510 passes through a slit 230 in a tray 220 of the target 200 and contacts the tray at a location that is not aligned with the slit 230 (for example at a location other than the location of the second alignment indicator 222 associated with the slit 230 through which the laser 510 passed).

At S430, if necessary, a user may adjust the alignment of the solar panel 310 based on the determined misalignment of the solar panel 310 at S420. For example, if the laser passes through a slit and contacts the back of the tray to the right (viewing from the perspective of FIG. 2C) of the second alignment indicator 222 corresponding to the slit 230 (such as the example laser 510C), then the user may adjust the solar panel 310 counterclockwise. If the laser 510 is to the left of the second alignment indicator 222 corresponding to the slit 230, then the solar panel 310 may be adjusted clockwise. If necessary, after adjusting the alignment of the solar panel 310, the user may then repeat S420 and determine if the adjustment was sufficient to align the solar panel 310 with the roof element.

Accordingly, the solar panel 310 may be aligned with a roof element quickly without measuring the location of the solar panel 310 or the target 200 and without using expensive equipment. After the solar panel 310 is aligned, other solar panels may be mounted side by side with the solar panel 310 on the rails 320. The methods described above may also be used to align other objects on a roof 105, such as the rails 320.

Many different embodiments of the inventive concepts have been shown. A person of ordinary skill in the art will appreciate that the features from different embodiments may be combined or replaced with other features from different embodiments.

The system may provide significant advantages over the devices known in the art. The system and device described herein may be used to align the solar panel 310 with roof elements such as a roof edge or rows of roof shingles so that the solar panel 310 is in alignment with the roof 105 or roof elements. The front face of a target 220 may be set perpendicular to the roof element and a laser 510 from the laser emitting device 500 may pass to the target 220 so that an alignment can be determined. Thus, the system may be advantageously used to determine an alignment of a solar panel 310 to a roof element.

A system may include a laser emitting device 500 and a target 200. The laser emitting device 500 may include a connector (including horizontal securing device 540 and vertical securing device 530) configured to connect to a device (such as solar panel 310) having a flat top extending in a first plane and a flat side extending in a second plane, and a laser emitter 560 connected to the connector such that when the connector is connected to the device, the laser emitter 560 is configured to emit a laser 510 in a first direction parallel to the first plane and the second plane. The target 200 may include a body 250, a tray 220 including at least one slit 230 in a front side of the tray 220 configured to allow passage of the laser 510 into the tray 220, a neck 240 connecting the body 250 to the tray, and legs 260 connected to the body and configured to support the body 250, neck 240, and tray 220.

The target 200 may further include an alignment device 280 including a flat side (second end). The alignment device 280 may be configured to adjustably extend from a first side of the body 250 with the flat side perpendicular to the front side of the tray 220. The neck 240 may be configured to adjust the height of the tray 220 relative to the body 250. The tray may include an alignment indication 222 for each of the at least one slit 230 which indicates an alignment angle for each of the at least one slit 230, respectively. The legs 260 may be configured to adjust a height of the body 250. The body may include a first slot on a first side of the body for the alignment device 280 to move in to adjustably extend out of the first side. The body may include a second slot on a second side of the body 250 opposite the first side. The second slot may be configured to receive the alignment devices 280 to allow the alignment device to adjustably extend from the second side of the body 250 with the flat side perpendicular to the front side of the tray. The at least one slit 230 may include at least three slits 230 or in some embodiments at least 5 slits 230.

A method of aligning one or more solar panels 310 on a roof 105 using the system described herein may include securing a laser device 500 to the one or more solar panels 310 such that a laser 510 emitted from the laser device is parallel to a plane of a top surface of the one or more solar panels 310 and parallel to a plane of a side of the one or more solar panels 310, placing a target 200 on the roof 105 aligned with an element of the roof (such as shingles 108), using the laser 510 emitted from the laser device 500 to determine an alignment of the one or more solar panels 310, wherein the target 200 includes a tray 220 with a plurality of slits 230, and the one or more solar panels 310 is determined to be misaligned if the laser 510 passes through a first slit of the plurality of slits and contacts the tray 220 at a location that is not aligned with the first slit 230, adjusting, based on the determination that the one or more solar panels is misaligned, the one or more solar panels 310, and using the laser 510 emitted from the laser device 500 to determine that the solar panel 310 is aligned with the element of the roof, wherein the one or more solar panels 310 is determined to be aligned if the laser 510 passes through a first slit 230 of the plurality of slits 230 at an alignment angle (indicated by the alignment indicators 222).

The method may further include placing the target 200 on the roof aligned with the element of the roof and in a location where the laser 510 contacts the tray 220 of the target 200 after initiating the laser device 500 to emit the laser 510. The tray 220 may include an indication of an alignment angle 222 in the tray 220 for the first slit 230, and the one or more solar panels 310 may be determined to be misaligned if the laser 510 passes through the first slit 230 and does not contact the indication of alignment angle 222 for the first slit 230.

The method may further include adjusting placement of the target 200 on the roof 105 after adjusting the one or more solar panels 310. The target 200 may be aligned with the element on the roof using an alignment device 280 with a flat side (second end) which can be extended out away from a body 250 of the target 200.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A method of aligning one or more solar panels on a roof, comprising:
    securing a laser device to the one or more solar panels such that a laser emitted from the laser device is parallel to a plane of a top surface of the one or more solar panels and parallel to a plane of a side of the one or more solar panels;
    placing a target on the roof, aligned with an element of the roof;
    using the laser emitted from the laser device to determine an alignment of the one or more solar panels, wherein the target includes a tray with a plurality of slits, and the one or more solar panels is determined to be misaligned if the laser passes through a first slit of the plurality of slits and contacts the tray at a location that is not aligned with the first slit;
    adjusting, based on the determination that the one or more solar panels is misaligned, the one or more solar panels; and
    using the laser emitted from the laser device to determine that the one or more solar panels is aligned with the element of the roof, wherein the one or more solar panels is determined to be aligned if the laser passes through a first slit of the plurality of slits at an alignment angle.

2. The method of claim 1, further comprising:
    placing the target on the roof aligned with the element of the roof and in a location where the laser contacts the tray of the target after initiating the laser device to emit the laser.

3. The method of claim 1, wherein
    the tray includes an indication of an alignment angle in the tray for the first slit, and
    the one or more solar panels are determined to be misaligned if the laser passes through the first slit and does not contact the indication of alignment angle for the first slit.

4. The method of claim 1, further comprising:
    adjusting placement of the target on the roof after adjusting the one or more solar panels.

5. The method of claim 1, wherein the target is aligned with the element on the roof using an alignment device with a flat side which can be extended out away from a body of the target.

* * * * *